(12) United States Patent
Massa et al.

(10) Patent No.: US 7,144,210 B2
(45) Date of Patent: Dec. 5, 2006

(54) TOOL HOLDER

(75) Inventors: Ted R. Massa, Latrobe, PA (US);
Robert A. Erickson, Raleigh, NC (US);
David R. Siddle, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 235 days.

(21) Appl. No.: 10/762,005

(22) Filed: Jan. 21, 2004

(65) Prior Publication Data

US 2005/0158135 A1 Jul. 21, 2005

(51) Int. Cl.
*B23Q 3/12* (2006.01)

(52) U.S. Cl. .................................. 409/234; 408/239 A

(58) Field of Classification Search ................ 409/232, 409/234; 408/239 A, 238; *B23Q 3/12; B23B 31/117*
See application file for complete search history.

(56) References Cited

U.S. PATENT DOCUMENTS

| | | | |
|---|---|---|---|
| 4,714,389 A | 12/1987 | Johne | |
| 4,840,520 A | 6/1989 | Pfalzgraf | |
| 4,886,402 A | 12/1989 | Pfalzgraf | |
| 5,030,047 A | 7/1991 | Pfalzgraf | |
| 5,201,621 A | 4/1993 | McMurtry et al. | |
| 5,716,173 A | 2/1998 | Matsumoto | |
| 5,775,857 A | 7/1998 | Johne | |
| 5,964,556 A | 10/1999 | Toyomoto | |
| 6,077,003 A | 6/2000 | Laube | |
| 6,224,306 B1 | 5/2001 | Hiroumi et al. | |

FOREIGN PATENT DOCUMENTS

| | | | |
|---|---|---|---|
| DE | 4003167 A1 | * | 9/1990 |
| DE | 4004150 A1 | * | 9/1990 |
| JP | 58059748 A | * | 4/1983 |
| JP | 62044350 A | * | 2/1987 |
| JP | 05301106 A | * | 11/1993 |
| JP | 07276168 A | * | 10/1995 |
| JP | 07299614 A | * | 11/1995 |
| JP | 08155774 A | * | 6/1996 |
| JP | 09038837 A | * | 2/1997 |
| JP | 2000158269 A | * | 6/2000 |
| JP | 2000158270 A | * | 6/2000 |
| JP | 2001300828 A | * | 10/2001 |
| JP | 2001310228 A | * | 11/2001 |
| JP | 2002103112 A | * | 4/2002 |
| JP | 2002346865 A | * | 12/2002 |

* cited by examiner

*Primary Examiner*—Daniel W. Howell
(74) *Attorney, Agent, or Firm*—Larry R. Meenan

(57) ABSTRACT

A rotary tool holder includes a shank having a flange, a tapered outer surface, and front and rear contact portions. The tapered outer surface corresponds to the tapered bore of a spindle, and flexible circular cantilevers are provided at one or both contact portions such that a free end of the cantilevers expands radially due to centrifugal force to maintain contact with the tapered bore. The shank can be formed from an inner member and a sleeve disposed thereover, in which portions of the sleeve form the circular cantilevers. The circular cantilevers can also be formed by a cavity created in the shank. Alternatively, instead of circular cantilevers, the shank of the tool holder can have a taper which is optimized for a certain speed, wherein the taper of the shank has a first taper at rest and a different, optimized taper at a desired speed.

7 Claims, 13 Drawing Sheets

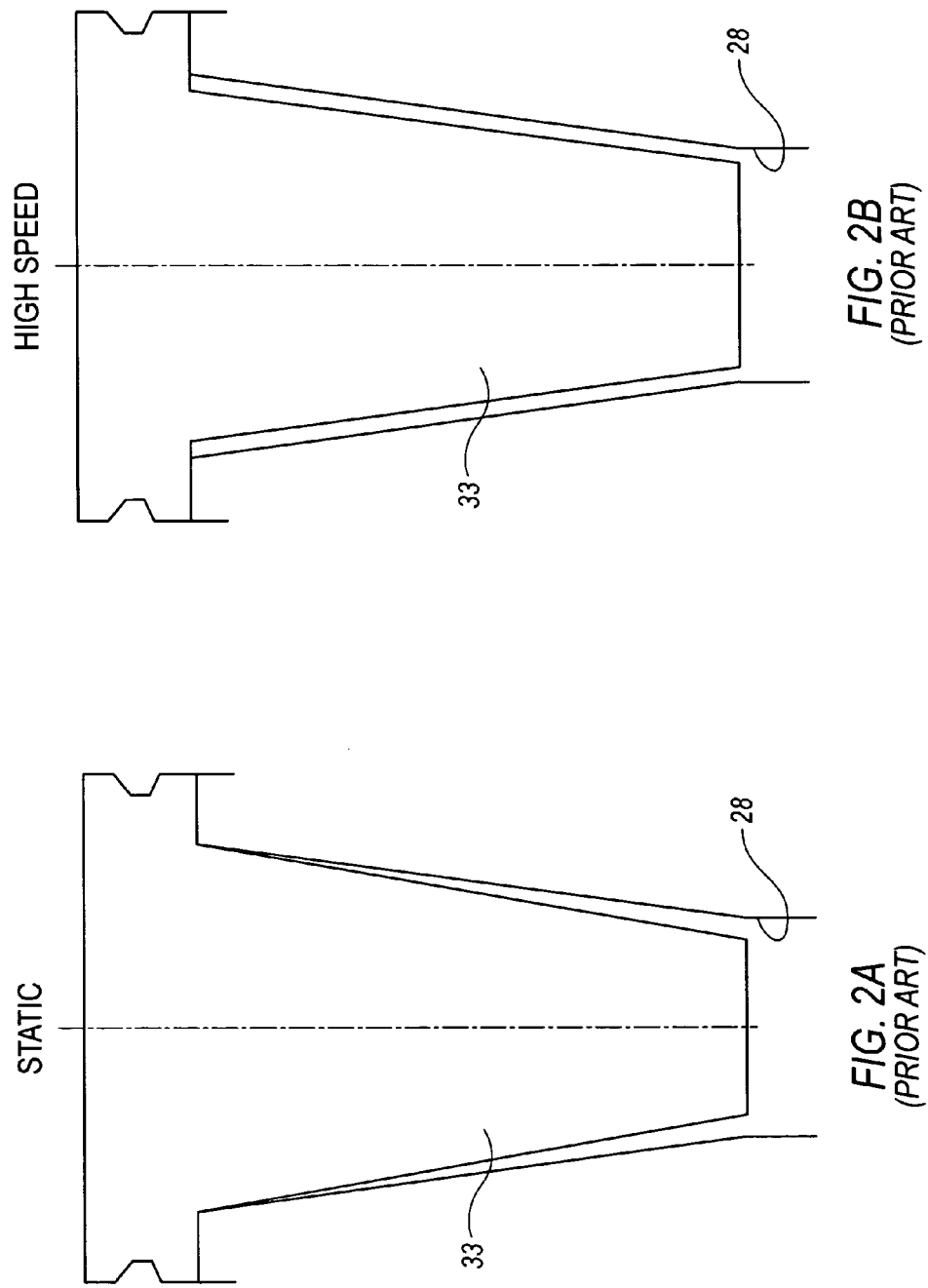

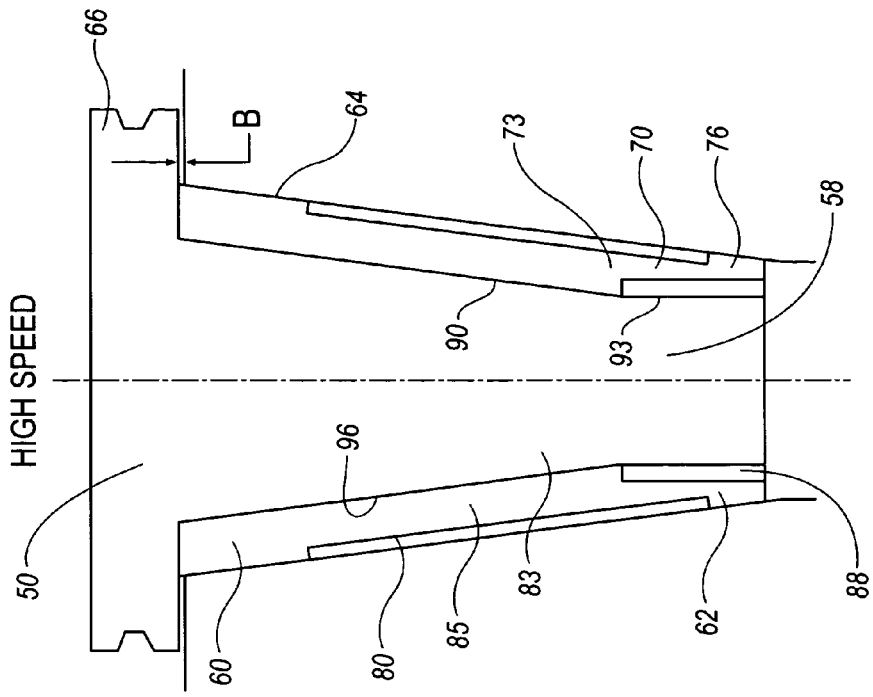
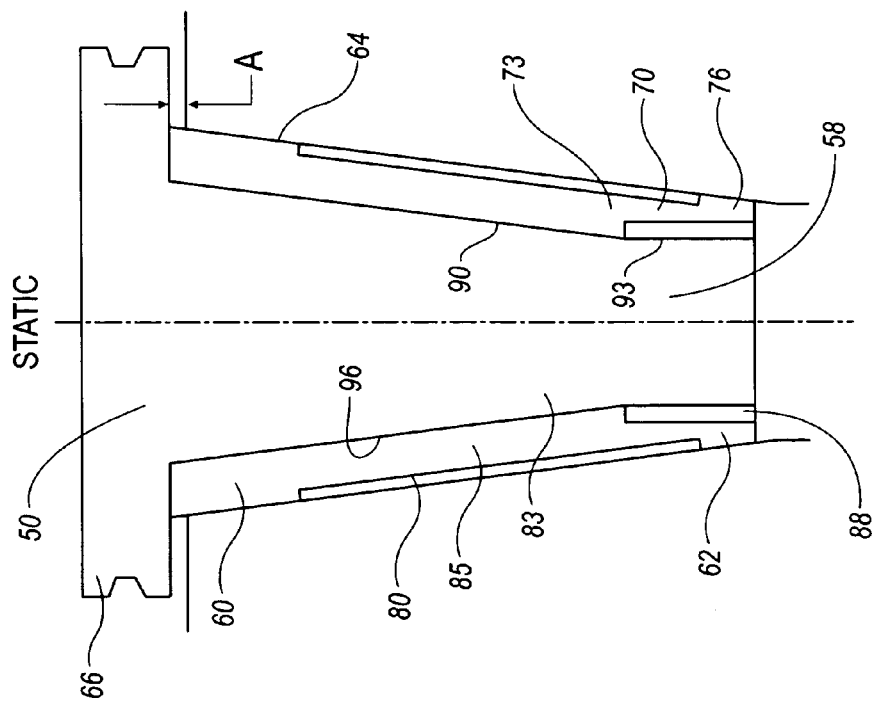

TOOL HOLDER

BACKGROUND OF THE INVENTION

1. Field of the Invention

The invention relates to a tool holder, and more particularly, a rotary tool holder for releasably holding rotary tool holders for precise cutting or grinding operations.

2. Description of the Background Art

Rotary tapered tool holders, commonly referred to as "steep taper" tool holders, are well known in the art. Steep taper tool holders have a male tapered portion extending from a V-flange portion. The V-flange portion has a V-shaped groove to assist the machine tool changer mechanism in gripping the tool. In the U.S., one of the most common steep taper tool holder designs is the Caterpillar V-flange tool holder, generally referred to as a "CV" tool holder. CV tool holders are one of several standards for very similar tool holder designs, all of which have 7/24 tapers (7 inches of diameter change per 24 inches of length.) Another common 7/24 tapered tool holder standard is the "BT" tool holder.

The tapered shank portion of the steep taper tool holder is held in a corresponding female tapered portion of a spindle. The tool holder is held in and rotated at high speeds by the spindle. There are generally two types of steep taper tool holders: (1) taper-only contact tool holders, in which only the tapered surface of the tool holder contacts the tapered inside surface of the spindle; and (2) face-taper contact tool holders, wherein the face of the tool holder flange is in contact with the face of the spindle in addition to surface contact between the tapered portion of the tool holder and the spindle. The face-taper contact type tool holder can require a specially designed spindle, wherein the mating face of the spindle is machined more precisely to facilitate operating in contact with the face of the tool holder V-flange portion.

Conventional steep taper tool holders of both types can suffer from certain problems. For example, in a standard steep taper tool holder the taper tolerances for tool holder taper and spindle taper produce a situation wherein the adjacent tapers are in hard contact at the front, but may be out of contact at the rear. When the tool holder is rotated, this divergence of taper angles can produce 'rocking' of the tool holder with resulting loss of accuracy and balance. As the spindle is rotated at high speeds, both the spindle taper diameter and the tool holder taper diameter increase under the influence of centrifugal force. However, the spindle taper diameter increases faster than the tool holder taper diameter. Moreover, the diametrical increase is typically not uniform along the length of the spindle taper, but is greatest at the front of the taper. As a result, the spindle taper angle changes, and the tapered surface can even become convex. If the spindle taper were to expand uniformly (maintain the same taper angle), then good fit between spindle and tool holder could be maintained at high speeds via the tool moving axially into the spindle. Unfortunately, because the spindle taper angle changes, the fit between tool holder and spindle degrades at high speeds. The result is two-fold for the standard tool holder. First, since the overall spindle taper diameter increases faster than the tool holder taper diameter, and there is no face contact, the tool holder is drawn into the spindle (moves axially). Second, because of the taper angle change, the primary contact, which is initially at the front of the taper, moves to the middle or rear of the taper, which results in increased 'rocking' of the tool holder in the spindle. The tool holder taper also increases in diameter and changes angle at high speeds, but the amount of change is very small compared to the spindle because the mean diameters of the tool holder are much smaller.

There are also disadvantages encountered with prior art face-taper contact steep taper tool holders. For example, "rocking' can be greatly reduced. However, as the tool holder is rotated at high speeds, the spindle taper diameter still increases faster than the tool holder taper diameter, although axial positioning is maintained due to the face contact. But, since the tool holder cannot be drawn into the spindle, a radial gap is produced between the tapers, which allows radial motion of the tool holder and results in loss of accuracy and balance.

Another prior art type face-taper contact tool holder uses a tapered sleeve on a shank which moves axially as the rotational speed increases so that the tool holder stays in contact with the spindle. The moveable sleeve can ease tolerancing requirements, but as the tool holder is rotated at high speeds the sleeve moves axially to stay in contact with the spindle. However, the sleeve also increases in diameter due to the centrifugal forces. Therefore, even though the sleeve maintains contact with the spindle, the sleeve can lose contact with the tool holder shank, resulting in a radial gap, thus resulting in unbalance and loss of accuracy.

Another prior art type face-taper contact tool holder uses a sleeve which is split such that it can flex circumferentially and therefore change diameter. The sleeve can thus stay in simultaneous contact with the tool holder shank and the spindle taper as the spindle taper diameter is changing. However, the sleeve still cannot adapt to the changing taper angle, such that contact is still localized at either the front or rear of the taper. Also, friction limits the ability of the sleeve to always maintain solid contact between tool holder and taper, and some 'slop' is bound to exist, reducing tool holder stiffness. The split sleeve can also be prone to contamination problems since any material that is present between the sleeve and the tool holder shank will reduce the design's effectiveness, and sealing can be impractical.

Therefore, the prior art face-taper contact tool holders can provide an improvement over the standard tool holder, but they can also have varying limitations at high speeds, increased mechanical complexity, and all require face contact.

Accordingly, there is a need for an improved steep taper tool holder which can overcome the limitations of the known steep taper tool holders, and reduce or eliminate taper related accuracy and balance problems.

SUMMARY OF THE INVENTION

According to the invention, a rotary tool holder for detachably retaining a rotary tool in the tapered bore of a spindle is provided wherein the tool holder comprises a shank with a tapered outer surface and front and rear contact portions. The shank also has a tapered outer surface corresponding to the tapered bore of the spindle, and a V-flange adjacent the front contact portion. In order to maintain contact with the tapered bore during rotation, a flexible circular cantilever portion can be provided adjacent the rear contact portion. The circular cantilever has a fixed end and a free end, wherein rotation of the rotary tool holder in the spindle bore results in the free end of the circular cantilever expanding radially under the influence of centrifugal force such that the free end maintains contact with the rear of the tapered bore, which also radially expands under the influence of centrifugal force during rotation.

In another embodiment, the tool holder has a circular cantilever adjacent both the front and rear contact portions, wherein preferably the free end of the circular cantilever located adjacent the front contact portion extends toward the flange and the free end of the circular cantilever located adjacent the rear contact portion extends toward a rear face of the shank. In this case, rotation of the tool holder in the spindle results in the free end of each of the circular cantilevers expanding radially under the influence of centrifugal force, such that the free ends maintain contact with the tapered bore at both the front and rear contact portions.

The tapered outer surface of the shank preferably has an annular recessed region located intermediate the front and rear contact portions, and in particular, intermediate the circular cantilevers.

The shank of the tool holder can be comprised of inner member and an outer sleeve member disposed over the inner member. The sleeve member has the tapered outer surface corresponding to the tapered bore of the spindle, and also includes end portions adjacent one or both of the front and rear contact portions. The end portions comprise the circular cantilevers described above. The aforesaid annular recessed region is provided in the tapered outer surface of the sleeve member, intermediate the front and rear contact portions of the shank.

In a further embodiment, a circular cantilever is created by a cavity formed in the rear face of the shank, wherein the exterior surface of the cavity forms at least part of the circular cantilever. A pull stud has a first end captured in the cavity and a second end external thereof, wherein the second end is that to which tension is applied in order to draw the tool holder into the bore of the spindle. Tension on the second end of the pull stud causes the first end to apply an outward radial force on the cavity, which urges the exterior surface, i.e., the circular cantilever, in a radially outward direction toward the tapered bore. More particularly, the cavity has an interior surface which tapers from a wider bottom region to a narrower region near the opening thereof, forming a bottle neck. The first end of the pull stud tapers from a larger distal portion captured in the wider region of the cavity to a narrower neck which extends through the narrower region of the cavity. Thus, as tension is applied, the second end of the pull stud acts to draw the larger distal portion from the cavity which urges the narrower region of the cavity radially outward.

A further embodiment of the invention comprises a tool holder having a taper which is optimized for a certain speed, or range of speeds. The tapered bore of the spindle has a taper defined by a front diameter and a rear diameter, wherein the rear diameter is smaller than the front diameter. The front and rear diameters each change at different rates under the influence of centrifugal force when the spindle is rotated, such that the tapered bore has a different taper at different speeds of rotation. According to the invention, an embodiment of the optimized taper tool holder has a shank with a tapered outer surface, wherein the taper is defined by a first diameter and a second diameter, which is smaller than the first diameter. Like the tapered bore of the spindle, the first and second diameters of the tool holder shank also each change at different rates under the influence of centrifugal force when the tool holder is rotated in the spindle. Consequently, the tapered outer surface also has a different taper at different speeds of rotation, but the taper is optimized to generally match the taper of the bore within a certain range of speeds. The first diameter of the shank is generally the same as the front diameter of the tapered bore (minus tolerance) when the tool holder and spindle are at rest. However, the second diameter is selected to cause the tapered outer surface of the shank to have an optimized taper when the shank is rotated at a certain speed, or within a certain range of speeds. The optimized taper is designed to substantially correspond to the taper of the tapered bore of the spindle at such speed, or range thereof. In this way, the taper of the shank changes to provide improved contact against the tapered bore at a predetermined speed, or range of speeds.

Other details, objects, and advantages of the invention will become apparent from the following detailed description and the accompanying drawings figures of certain embodiments thereof.

BRIEF DESCRIPTION OF THE DRAWINGS

FIGS. 2a and 2b are diagrammatic representations of a prior art face-taper contact steep taper tool holder.

FIGS. 6a and 6b illustrate another embodiment of a steep taper tool holder according to the invention.

DESCRIPTION OF THE PREFERRED EMBODIMENTS

Figure 1B:
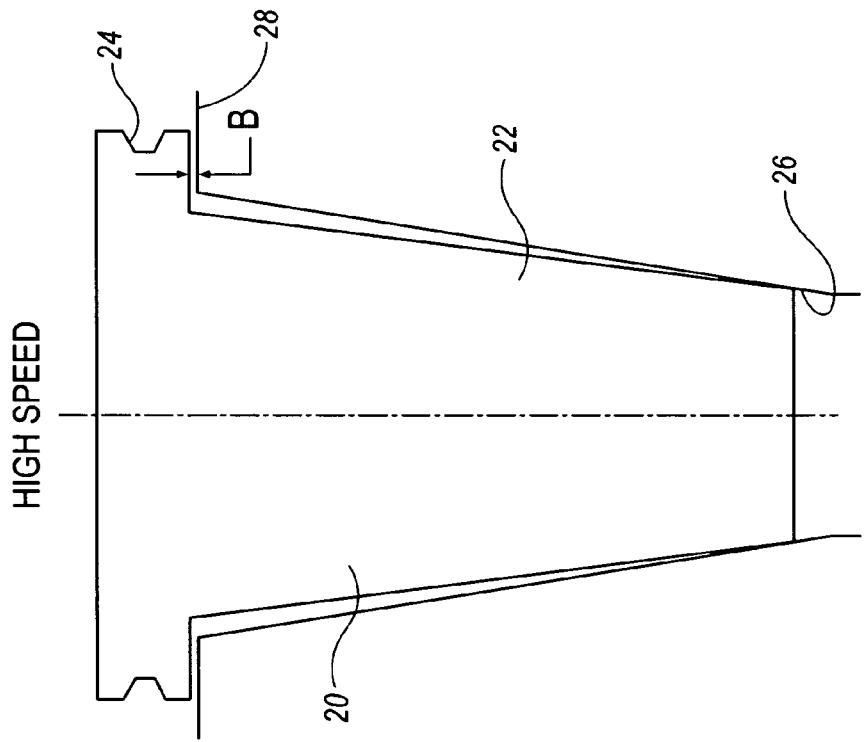
FIGS. 1a and 1b are diagrammatic representations of a prior art taper only contact, standard steep taper tool holder.

Referring now to the drawing figures, prior art steep taper tool holders are illustrated in FIGS. 1a through 4b. The standard, taper contact only, steep taper tool holder 20 (FIGS. 1a and 1b) has a male tapered portion 22 extending from a V-flange portion 24. The tapered portion 22 is held in a corresponding female tapered portion 26 of a spindle 28. The tool holder 20 is held in the spindle 28 by a pull stud (see FIG. 5) and rotated at high speeds by a motor (not shown) which drives the spindle 28.

Figure 1A:
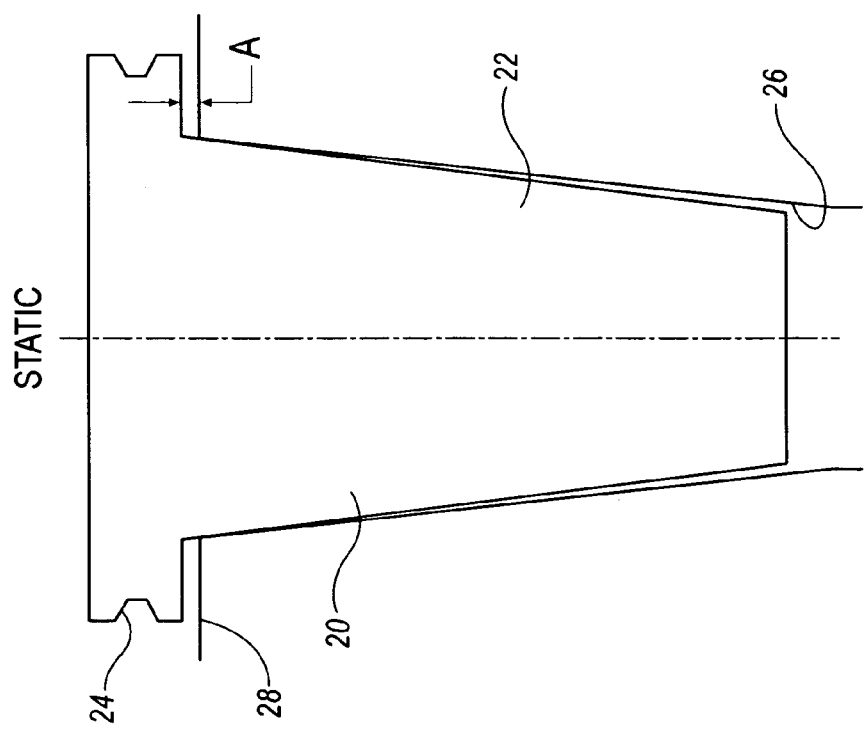

As explained previously, the standard steep taper tool holder suffers from certain disadvantages. As shown in FIG. 1a, wherein the tool holder is at rest, the tool holder taper contacts the spindle taper at a front contact region, commonly referred to as the "front gauge line." This occurs because of the taper tolerances for tool holder taper and the spindle taper. When the tool holder 20 is rotated at high speed, illustrated in FIG. 1b, this divergence of taper angles can produce 'rocking' of the tool holder 20 with resulting loss of accuracy and balance. As the spindle 28 is rotated at high speeds, both the spindle taper diameter and the tool holder taper diameter increase under the influence of centrifugal force. However, the spindle taper diameter increases faster than the tool holder taper diameter. Moreover, the diametrical increase is typically not uniform along the length of the spindle taper, but is greatest at the front of the taper. Consequently, the spindle taper angle changes, and the tapered surface can even become convex. The result is two-fold for the standard tool holder 20. First, since the overall spindle taper diameter increases faster than the tool holder taper diameter, and there is no face contact, the tool holder 20 is drawn into to the spindle 28 (moves axially), as can be seen in the difference between dimension A in FIG. 1*a* and dimension B in FIG. 1*b*. Second, because of the taper angle change, the primary contact, which is initially at the front of the taper, i.e., the front gauge line, shifts to the middle or rear of the taper, which results in increased rocking of the tool holder 20 in the spindle 28.

Some specific examples of prior art face-taper contact steep taper tool holders are the DAISHOWA SEIIKI BIG-PLUS™, SHOWA D-F-C™, and NIKKEN 3LOCK™. The BIG-PLUS™ tool holder 33, shown only generally in FIGS. 2*a* and 2*b*, is made to very tight dimensional tolerances such that simultaneous face and taper contact is produced—but there is only minimal interference between the tapers due to high component stiffness and the relatively low retention force. However, as shown in FIG. 2*a*, the taper contact is still primarily at the front gauge line, due to tolerancing of the respective tapers. Because of the face contact, 'rocking' is greatly reduced for the tool holder 33 when at rest. As this tool holder 33 is rotated at high speeds, the spindle taper diameter once again increases faster than the tool holder taper diameter, as shown in FIG. 2*b*. Because the tool holder 33 can not be drawn into the spindle 28 due to the face contact, a radial gap is produced between the tapers. This gap allows radial motion of the tool holder 33, resulting in loss of accuracy and balance. However, axial positioning is maintained by the face contact.

Figure 3A:
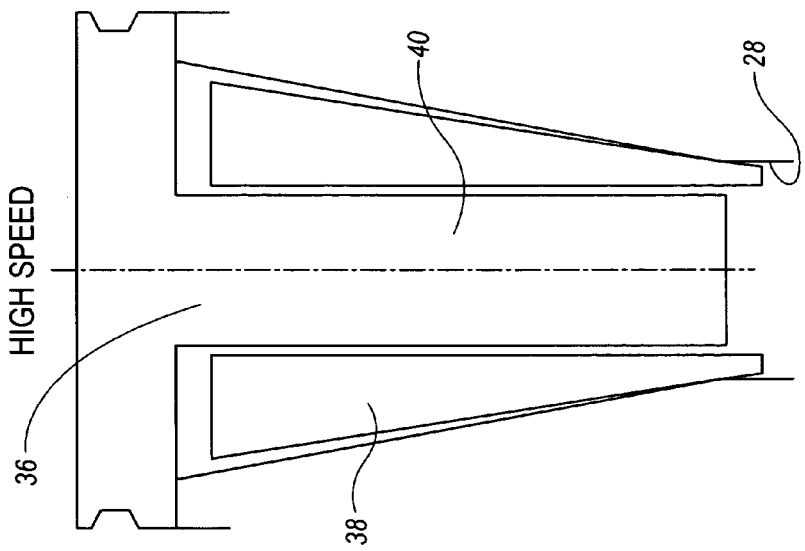
FIGS. 3a and 3b are diagrammatic representations of a second prior art face-taper contact steep taper tool holder.
Figure 3B:
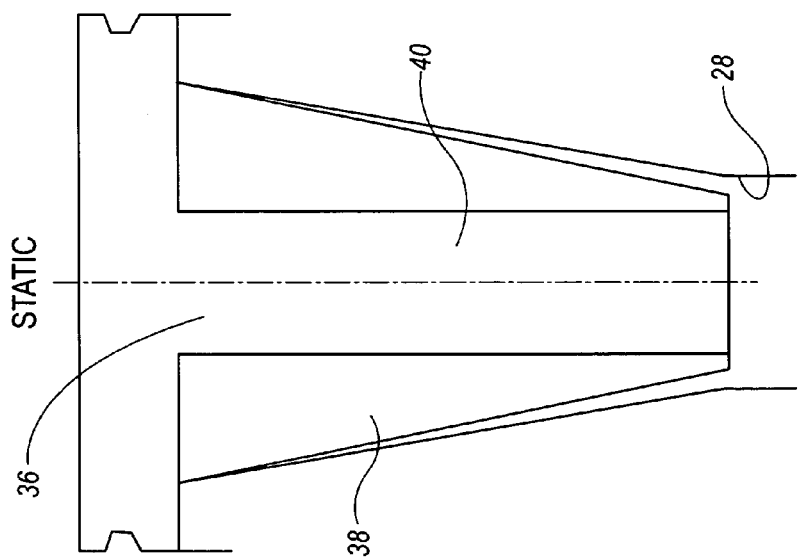

Referring now to FIGS. 3*a* and 3*b*, the SHOWA D-F-C™ steep taper tool holder 36 has a spring-loaded tapered sleeve 38 on a cylindrical shank 40, combined with face contact. The intended purpose of the sleeve 38 is to move axially as the rotational speed increases so that the tool holder 33 stays in contact with the spindle 28. The use of the moveable sleeve 38 also eases the tolerancing requirements that are more critical on the BIG-PLUS™ tool holder. At rest, the main contact is still at the front gauge line, as shown in FIG. 3*a*. As the D-F-C™ tool holder is rotated at high speeds, the sleeve 38 moves axially to stay in contact with the spindle 28, as shown in FIG. 3*b*. However, the sleeve 38 also increases in diameter due to the centrifugal forces. Therefore, even though the sleeve 38 maintains contact with the spindle 28, the sleeve 38 can lose contact with the tool holder shank 40, resulting in a radial gap. As a result, the situation is similar to the BIG-PLUS™ tool holder in that the tool holder 33 can move radially, producing unbalance and loss of accuracy.

Figure 4B:
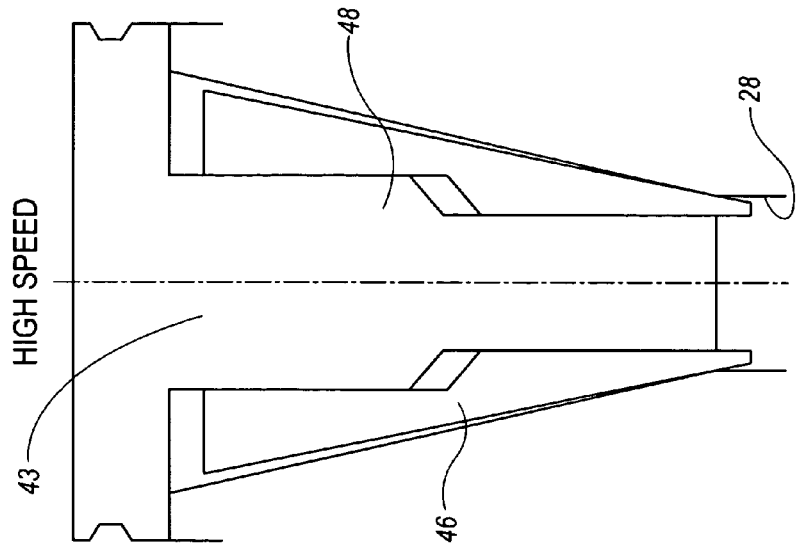
FIGS. 4a and 4b are diagrammatic representations of a third prior art face-taper contact steep taper tool holder.
Figure 4A:
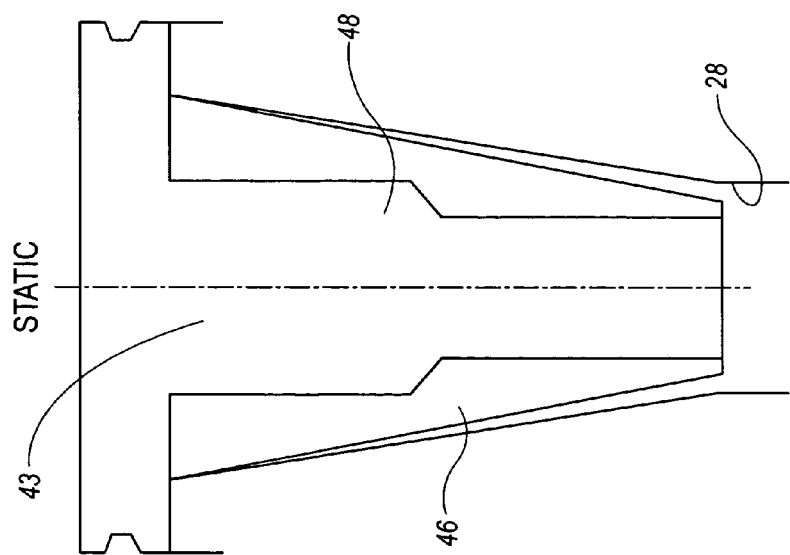

Referring now to FIGS. 4*a* and 4*b*, the NIKKEN 3LOCK™ tool holder 43 is similar to the D-F-C™ tool holder 33, except the sleeve 46 is split such that it can flex circumferentially and therefore change diameter. The flexible sleeve 46 overcomes one limitation of the D-F-C™ tool holder, since the sleeve 46 can now stay in simultaneous contact with the tool holder shank 48 and the spindle taper as the spindle taper diameter is changing. However, the sleeve 46 still cannot adapt to the changing taper angle, such that contact is still localized at either the front or rear of the taper, as shown in FIG. 4*b*. Also, the presence of friction limits the ability of the sleeve 46 to always maintain solid contact between tool holder 43 and taper—some 'slop' is bound to exist, reducing tool holder stiffness. The split sleeve 46 can also be prone to contamination problems since any material that is present between the sleeve 46 and the tool holder shank 48 will reduce the design's effectiveness, and sealing the design can be impractical.

Each of the prior art tool holder designs described above, generally in the order listed, can provide an incremental improvement over the previous designs. However, each can also have corresponding increases in mechanical complexity, and all require a face contact to operate. Moreover, although each appear to be effective when at rest, they each have varying limitations at high speeds.

Figure 5:
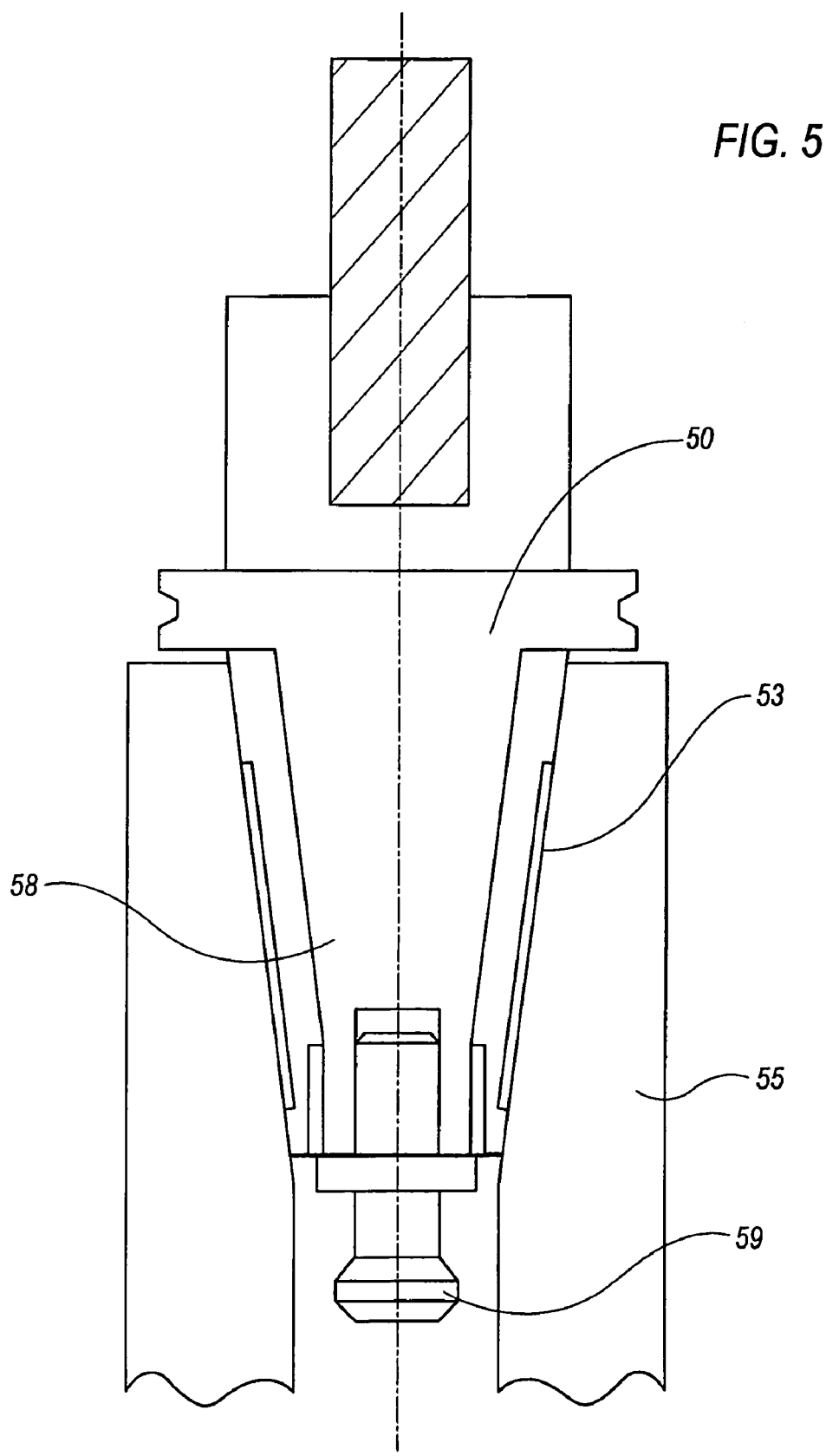
FIG. 5 illustrates an embodiment of a steep taper tool holder according to the invention.

Referring now to FIGS. 5 and 6*a*–6*b*, there is shown an embodiment of a rotary, steep taper tool holder 50 for detachably retaining a rotary tool in the tapered bore 53 of a spindle 55. The rotary tool holder 50 comprises a shank 58 having a front contact portion 60, a rear contact portion 62 and a tapered outer surface 64 which corresponds to the tapered bore 53 of the spindle. The tool holder 50 also has the usual flange member 66 adjacent the front contact portion 60 thereof, and the front contact portion 60 of the tapered shank 58 is designed to provide contact with the tapered bore 53 of the spindle 55, such that no face contact is intended. According to this embodiment of the invention, a single circular cantilever 70 can be provided on the shank 58 adjacent to either the front 60 or rear 62 contact portions thereof. In this particular embodiment, the circular cantilever 70 is provided adjacent the rear contact portion 62 of the shank, as shown in FIG. 5–6*a*. As the term "cantilever" implies, the circular cantilever has a fixed end 73 and a free end 76, which is designed to move radially outward under the influence of centrifugal force when the tool holder 50 is rotated in the spindle 55.

As explained previously, when the spindle 55 and tool holder 50 rotate at high speeds, centrifugal force causes both the tapered bore 53 of the spindle 55 and the shank 58 of the tool holder 50 to expand radially outward. When the tool holder 50 is rotated in the tapered bore 53 of the spindle 55, the circular cantilever 70, and specifically the free end 76 thereof, expands radially outward along with the outwardly expanding tapered bore 53, such that the free end 76 maintains contact with the rear of the tapered bore 53. Also, as the tapered bore 53 enlarges radially at the front thereof, the tool holder 50 is drawn axially into the tapered bore 53, thus hard contact is maintained at the front of the tapered bore 53. In this way, the tool holder 50 adjusts to taper angle mismatches and changing taper angles at elevated speeds. As a result, although the tool holder 50 does move axially, hard contact is maintained at both the front and rear of the taper under all operating conditions. This two location contact eliminates rocking and radial motion of the tool holder 50 and thus eliminates the associated accuracy and balance problems.

Additionally, the tapered outer surface 64 of the shank 58 is provided with an annular recessed region 80 intermediate the front 60 and rear 62 contact portions. In this way, the tapered shank 58 fits up to the tapered bore 53 such that there is contact only at the front 60 and rear 62 contact areas. The rear contact region 62 on the shank 58 is unsupported, in other words, it is on the free end 76 of the circular cantilever 70. Therefore, the amount of deformation and flexibility at the contact region 62 can be adjusted by controlling the length and thickness of the free end 76 of the cantilever 70.

The annular recessed region 80 also permits the free end 76 of the circular cantilever 70 to move radially without stressing or deforming the outer surface of the tapered shank 58. The annular recess 80 also facilitates manufacture of the tapered outer surface of the shank 58 to the proper tolerances to achieve a good fit in the tapered bore 53 of the spindle 55.

As illustrated, the tapered shank 58 of the tool holder 50 can be comprised of an inner member 83 and a sleeve member 85 disposed over the inner member 83. The outer surface of the sleeve member 85 comprises the tapered outer surface 64 of the shank 58. The sleeve member 85 also has a first end, and a first portion thereof which forms the circular cantilever 70 at the rear contact portion 62 of the shank 58. The circular cantilever 70 is essentially a portion of the first end of the sleeve member 85 which extends axially over the inner member 83 adjacent the rear contact portion 62, but with a narrow gap 88 provided therebetween.

More particularly, the inner member 83 is formed with an outside mating surface having a tapered portion 90 and a generally cylindrical portion 93 adjacent the free end 76 of the circular cantilever 70. The sleeve 85 has an inside mating surface which has a tapered portion 96 corresponding to the tapered portion 90 of the outside mating surface of the inner member 83. The portion of the sleeve member 85 which forms the circular cantilever 70, and more particularly, the free end 76 thereof, is spaced apart from the generally cylindrical portion 93 of the outside mating surface, thus providing the aforesaid gap 88 therebetween.

The gap 88 between the free end 76 of the circular cantilever 70 and the inner member 83 permits the free end 76 to be partially compressed radially inward, toward the inner member 83, when the tool holder 50 is disposed and retained in the tapered bore 53 of the spindle 55. Typically, the tool holder 50 is drawn tight into the tapered bore 53 by applying tension to the pull stud 59 (shown in FIG. 5) prior to rotation of the tool holder 50. In general, there is about 5000 or 6000 pounds of axial force which will pull the tool holder 50 into the spindle 55, via the pull stud 59, which will reduce the diameter of the circular cantilever 70. The free end 76 of the circular cantilever 70 will thus be forced radially inward, which will store elastic energy in the cantilever 70. Then, when the tool holder 50 is rotated at high speeds and the spindle bore 53 opens in diameter radially, the free end 76 will return toward the unloaded position, i.e., expand radially outward, and while doing so will stay in contact with the spindle bore 53. This improves the design of the circular cantilever 70, because it reduces the range of outward radial flex which would otherwise be required by the free end 76.

The sleeve member 85 can be press, or shrink, fitted onto the inner member 83. The undercut sections, i.e., free end 76, of the circular cantilever 70 of the sleeve 85, by the inherent (but controllable) flexibility, permit taper contact at selected locations (in this case the rear contact portion 62), and do so with reasonable manufacturing tolerances. Further, because the flexibility of the free end 76 allows sizable radial deformation, the design is suitable for high speed operation without loss of radial accuracy. The circular cantilever 70 can compensate for differences in taper angles between the spindle 55 and the tool holder 50. It can also compensate for differences in radial expansion rates between spindle bore 53 and the shank 58 of the tool holder 50, including different expansion rates at the front and rear of the tapers.

Figure 7B:
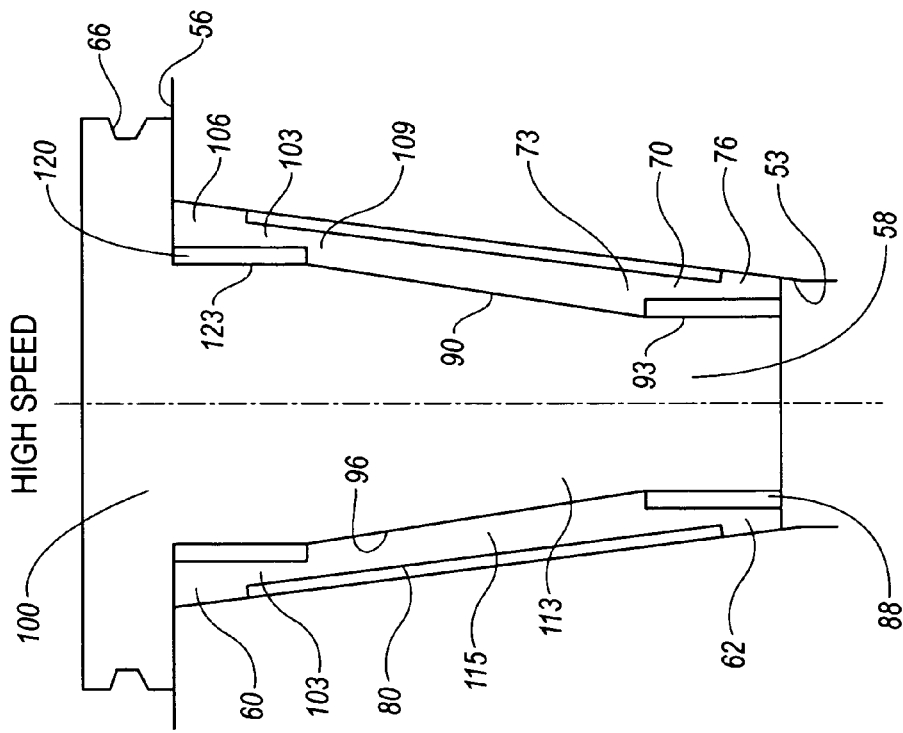
FIGS. 7a and 7b illustrate a further embodiment of a steep taper tool holder according to the invention.
Figure 7A:
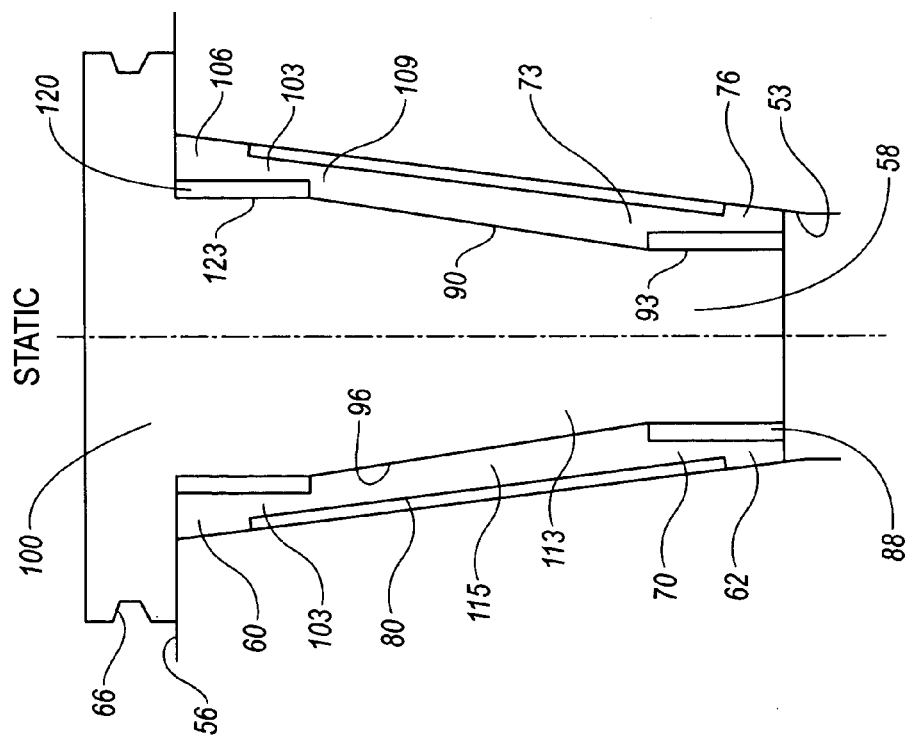

Referring now to FIGS. 7a and 7b, another embodiment of a tool holder 100 according to the invention is illustrated. This tool holder 100 is similar to the tool holder 50 described above, except that a second circular cantilever 103 is provided at the front contact portion 60 of the shank 58. This embodiment of the tool holder 100 is also different in that face contact between the V-flange 66 and the face 56 of the spindle 55 is designed to occur. Thus, axial movement of the tool holder 100 into the bore 53 of the spindle 55 is prevented. However, in this tool holder 100, the second circular cantilever 103, likewise having a free end 106 and a fixed end 109, is provided at the front contact portion 60 of the shank 58. The free end 106 is located adjacent the front contact portion 60 and extends toward the flange 66. In this embodiment, rotation of the tool holder 100 in the spindle 55 results in the free ends 76 and 106 of each of the first 70 and second 103 circular cantilevers expanding radially under the influence of centrifugal force such that the free ends 76 and 106 maintain contact with the tapered bore 53 as the tapered bore 53 also expands under the influence of centrifugal force. Because the face contact prevents the tool holder 100 from being drawn axially into the tapered bore 53 of the spindle 55, the circular cantilever 103 at the front contact portion 60 is employed to allow the front contact portion 60 of the tool holder 100 to maintain contact with the tapered bore 53 of the spindle 55 during rotation.

The tool holder 100 thus eliminates all of the sources of error described previously. The tool holder 100 will not have tool rocking, radial motion, or axial motion. However, the tool holder 100 does require face contact with the spindle 55, and therefore is not directly interchangeable with all current tools and machines. Nevertheless, it is relatively easy to modify current spindles to accept face contact, and the modified spindles would still be compatible with conventional, non-face contact tools.

Also similarly to the single circular cantilever tool holder 50, the shank 58 of the dual circular cantilever tool holder 100 is comprised of an inner member 113 and an outer sleeve member 115 disposed over the inner member 113. This sleeve member 115 can be like the sleeve member 85 described in connection with the single circular cantilever tool holder 50, including the tapered outer surface and the first circular cantilever 70 at the first end thereof adjacent the rear contact portion 62 of the shank 58. However, this sleeve member 115 further includes the second circular cantilever 103, which is formed by a second portion of the sleeve member, at a second end thereof which is adjacent the front contact portion 60 of the shank 58. The free end 106 of the second circular cantilever 103 extends adjacent the front contact portion 60 of the shank 58, toward the flange 66, with a gap 120 between the free end 106 and the inner member 113 of the shank.

Like the inner member 83, the inner member 113 has a generally cylindrical portion 93 near the rear contact portion 62 and a tapered portion 90. However, the inner member 113 further has a second generally cylindrical portion 123 adjacent the front contact portion 60, such that the tapered portion 90 is intermediate the two generally cylindrical portions 123, 93 adjacent the front 60 and rear 62 contact portions. Like the sleeve member 85, the sleeve member 115 is formed with the inside mating surface 96 which has a tapered portion corresponding to the tapered portion of the outside mating surface 90 of the inner member 113. The first and second portions of the sleeve member 115 which form the circular cantilevers 70, 103, and more particularly the free ends 76, 106 thereof, are spaced apart from the generally cylindrical portions 93, 123 of the inner member 113 such that there are gaps 88, 120 between each free end 76, 106 and the adjacent generally cylindrical portions 93, 123. The gaps 88, 120 are provided for the same reasons described previously in connection with the single circular cantilever tool holder 50.

During rotation, the free end 76 of the first circular cantilever 70 expands to maintain contact with the tapered bore 53 at the rear contact region 62, and the free end 106 of the second circular cantilever 103 expands to maintain contact with the tapered bore 53 at the front contact region 60, while the face contact between the flange 66 and the spindle face 56 prevents the tool holder 100 from being drawn axially into the spindle 55. In this manner, all of the aforesaid sources of error, i.e., rocking, radial motion, and axial motion, are eliminated.

Additionally, like the single cantilever tool holder 50, the tapered outer surface of the sleeve member 115 has the annular recessed region 80 which is located intermediate the two circular cantilevers 70, 103, which is provided for the same reasons described previously.

Figure 8:
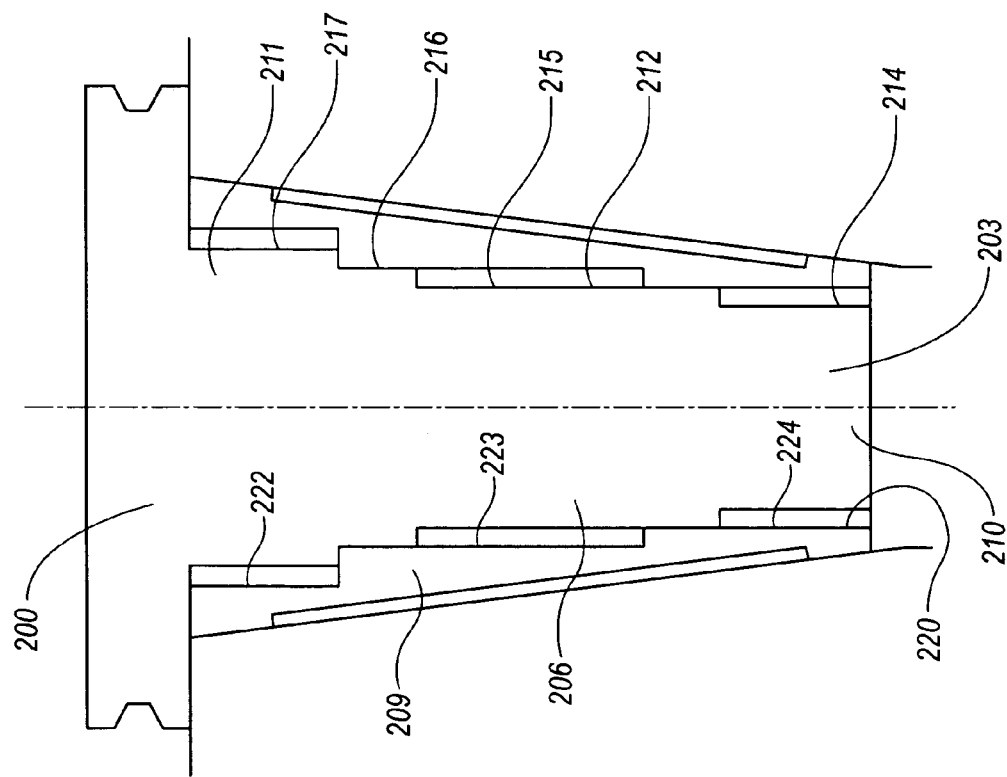
FIG. 8 illustrates a further embodiment of a steep taper tool holder according to the invention.

Referring to FIG. 8, another embodiment of dual circular cantilever tool holder 200 is illustrated, wherein the shank 203 is comprised of a stepped inner member 206 and a sleeve member 209 disposed thereover. In this embodiment, the inner member 206 has a stepped outer surface 212, formed from a plurality of generally cylindrical portions 214, 215, 216, and 217, each of which has an increasingly larger diameter from a smaller diameter at the rear portion 210 of the shank 203 to a larger diameter at the front portion 211 thereof. The sleeve member 209 has a complimentarily shaped stepped bore 220, i.e., formed from a plurality of generally cylindrical regions 222, 223, and 224, each of which increases in diameter from a smaller diameter at the rear portion 210 of the shank 203 to a larger diameter at the front portion 211 thereof. Two of the plurality of generally cylindrical regions, namely regions 223 and 224 of the sleeve member 209, mate with two of the generally cylindrical portions, namely portions 215 and 216, of the inner member 206. As illustrated, the cylindrical regions 223 and 224 and cylindrical portions 215 and 216 may only partially overlap when the sleeve member 209 is disposed over the inner member 206, such as, for example, by press fitting. In one presently preferred embodiment, the inner member 203 has four generally cylindrical portions 214–217, and the sleeve member 209 has three generally cylindrical regions 222–224.

Figures 9A, 9B:
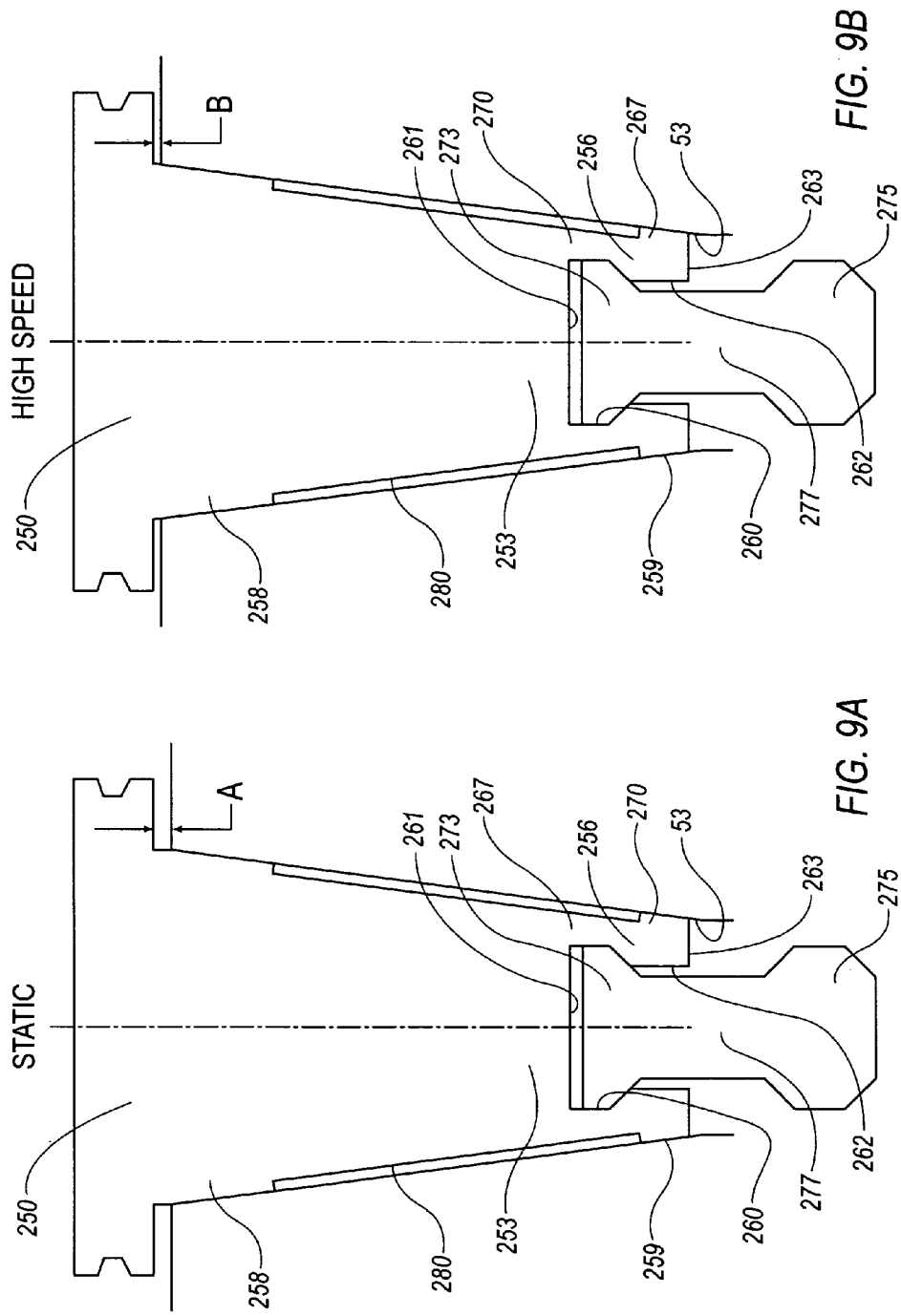
FIGS. 9a and 9b illustrate a further embodiment of a steep taper tool holder according to the invention.

FIGS. 9a and 9b illustrate a further embodiment of a tool holder 250 according to the invention wherein the tool holder 250 has a tapered shank 253 and a single circular cantilever 256 adjacent the rear contact portion 259 of the shank 253, similarly to the single cantilever tool holder 50 shown in FIGS. 5–6b. However, this embodiment of the tool holder 250 has a cavity 260 formed in a rear face 263 of the shank 253, in which the side wall of the cavity, particularly the exterior surface thereof, forms the circular cantilever 256 at the rear contact surface 259. Like the tool holder 50 referred to above, the circular cantilever 256 in this embodiment of the tool holder 250 extends toward rear face 263 of the shank 253. Unlike the either of the tool holders 50, 100 described previously, i.e., in connection with FIGS. 5–7b, the shank 253 of this tool holder 250 is not comprised of an inner member and an outer sleeve having end portions which form the one or more circular cantilevers. Instead, the circular cantilever 256 of this tool holder 250 is formed by creating the cavity 260 in the rear face 263 of the shank 253 such that the side wall of the cavity 260 becomes the circular cantilever 256 wherein the fixed end 267 is adjacent the bottom 261 of the cavity 260 and the free end 270 is at the opening of the cavity 262.

The tool holder 250 employs a multi-piece wedge-locking system to produce contact of the circular cantilever 256 on the rear of the tapered shank 253 with the bore 53 of the spindle 55. In this design, the free end 270 of the circular cantilever 256 is forced into contact with the spindle bore 53 via the wedge locking action after the tool holder 250 is pulled into the spindle bore 53. The wedge lock and circular cantilever 256 combination allow the shank 253 to stay in contact with the spindle bore 53 in spite of taper angle errors and taper dimensional changes during operation.

Typically, the pull stud 59 has a threaded shaft portion which is received in a threaded bore in the shank, for example as illustrated in FIG. 5. In that type of engagement, tension on the pull stud 59 will not result in any significant outward radial force on the rear contact surface 62 of the shank 58. However, as shown in FIGS. 9a and 9b, the cavity 260 formed in the rear face 263 of the shank 253 is specifically configured to capture a specially configured distal end 273 of a pull stud 275, such that tension applied to the pull stud 275 results in creating an outward radial force on the side wall of the cavity 260, and thus the free end 270 of the circular cantilever 256. Consequently, when the tool holder 250 is positioned in the spindle bore 53, and tension is applied to the pull stud 275, the tension will further encourage outward radial expansion of the free end 270 of the circular cantilever 256, thereby urging the free end 270 against the tapered bore 53 of the spindle 55.

More particularly, the cavity 260 has an interior side wall surface which tapers from a wider region at the bottom 261 of the cavity 260 to a narrower region near the opening 262 of the cavity 260, forming a bottle neck. The distal end 273 of the pull stud 275 captured in the cavity 260 has complimentary shape, having a wider end portion which tapers to a narrower shaft 277 which extends through the opening 262 of the cavity 260. The taper of the interior surface of the cavity 270 corresponds to the taper on the distal end 273 pull stud 275. Tension applied to the pull stud 275 tries to draw the wider distal end 273 out from the cavity 260 because the front 258 and rear 259 contact surfaces of the shank 253 prevents the tool holder 250 from moving axially into the bore 53 of the spindle 55. The corresponding tapers of the inside of the cavity 260 and the distal end 273 of the pull stud 275 captured in the cavity 260 cooperate such that, in order for the wider distal end 273 of the pull stud 275 to be removed from the cavity 260, the side wall of the cavity 260, which is the free end 270 of the circular cantilever 256, must expand outward radially. Consequently, tension on the pull stud 275 further activates the outward radial expansion of the circular cantilever 256, urging it into contact with the tapered bore 53 of the spindle 55.

The tool holder 250 thus provides the same type of advantages as the previously described single cantilever tool holder 100 illustrated in FIGS. 5–6b. When the tool holder 250 is rotated in the tapered bore 53 of the spindle 55, the circular cantilever 256 and specifically the free end 270 thereof, will expand radially outward along with the outwardly expanding tapered bore 53, such that the free end 270 maintains contact with the rear part of the tapered bore 53. Since there is also no face contact with this tool holder 250, as the tapered bore 53 enlarges radially adjacent the front contact area 258, the tool holder 250 will be drawn axially into the tapered bore 53. Thus, hard contact is also maintained adjacent the front contact region 58 of the tapered bore. In this way, the tool holder 250 likewise adjusts to taper angle mismatches and changing taper angles at elevated speeds. Therefore, although the tool holder 250 does move axially, hard contact is maintained at both the front 258 and rear 259 contact portions under all operating conditions. Consequently, rocking and radial motion of the tool holder 250 is eliminated, along with the attendant accuracy and balance problems.

Additionally, instead of a thin solid cantilevered ring, the circular cantilever 256 could alternatively be a split ring with multiple radial slots to add flexibility. The design of the pull stud can assume various configurations to complement the design of the split ring. However, in either case, the cantilever 256 can be dimensioned such that hard contact between the free end 270 and the spindle bore 53 does not occur until after the tool holder 250 is axially seated. If not, the wedge locking action could preclude further axial motion of the tool holder 250 into the spindle 55. One advantage of this design is lower tool holder 250 release forces because the circular cantilever 256 will not be in contact with the spindle bore 53 after the tool holder locking force, i.e., tension on the pull stud 275, is released.

Also, similarly to the previously described tool holders 50, 100, this embodiment of the tool holder 250 has an annular recessed region 280 in the tapered outer surface of the shank 253 intermediate the front 258 and rear 259 contact portions. The annular recessed region 280 is provided for the same reasons described previously with regard to the annular recessed region 80 of the tool holders 50 and 100. It will be appreciated that it is not necessary to include the annular recess region 280 on all embodiments of the tool.

Figure 10:
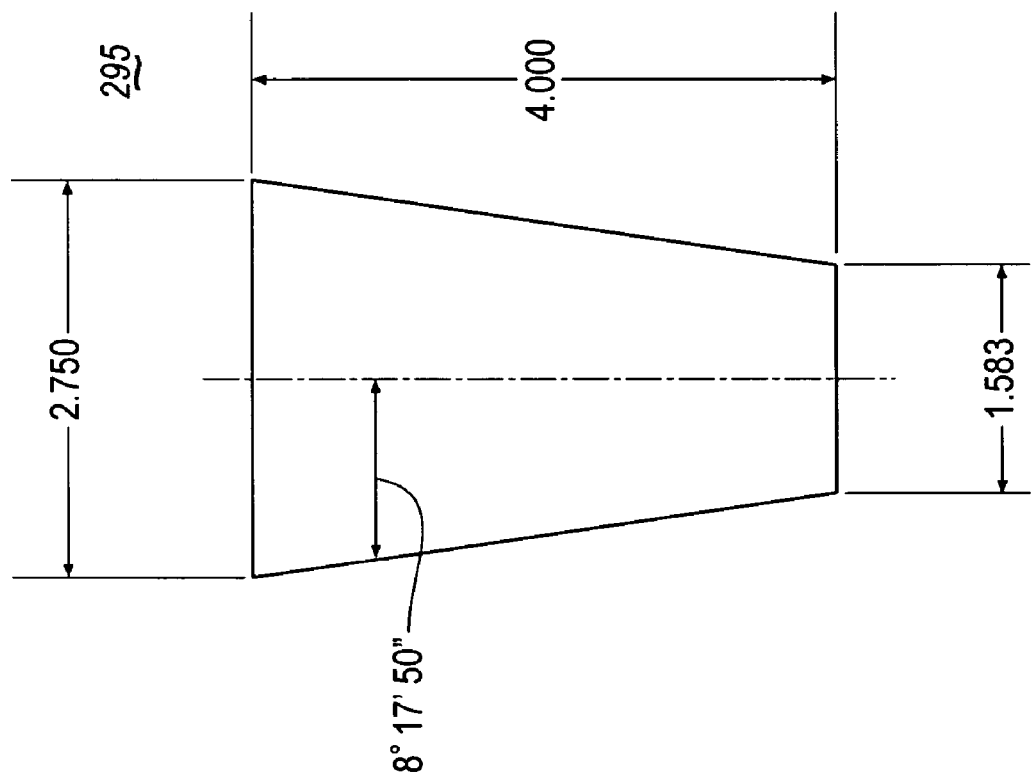
FIG. 10 provides dimensional information for a prior art standard tool holder.

FIGS. 10 shows dimensional details of a prior art contact only steep taper tool holder 295. As illustrated, the standard steep taper tool holder has a 2.750 inch major taper diameter (front contact area) and a 4.00 inch taper length. With the typical 7/24 taper (16 deg 35 min 40 sec) angle, this translates to a 1.583 inch minor diameter (rear contact area). In FIG. 10, the taper half angle (8 deg 17 min 50 sec) is shown. The 16 deg 35 min 40 sec angle is the "basic" angle dimension for a 7/24 taper angle. In other words, the male tool holder taper has a "plus" tolerance from this basic angle and the female spindle has a "minus" tolerance from this basic angle. The amount of each tolerance is a function of the "class of fit" for the taper. For example, a typical tool holder is an "AT3" tolerance which is 16 deg 35 min 40 sec/16 deg 35 min 46 sec. A typical spindle is an "AT2" tolerance which is 16 deg 35 min 36 sec/16 deg 35 min 40 sec.

Figure 11:
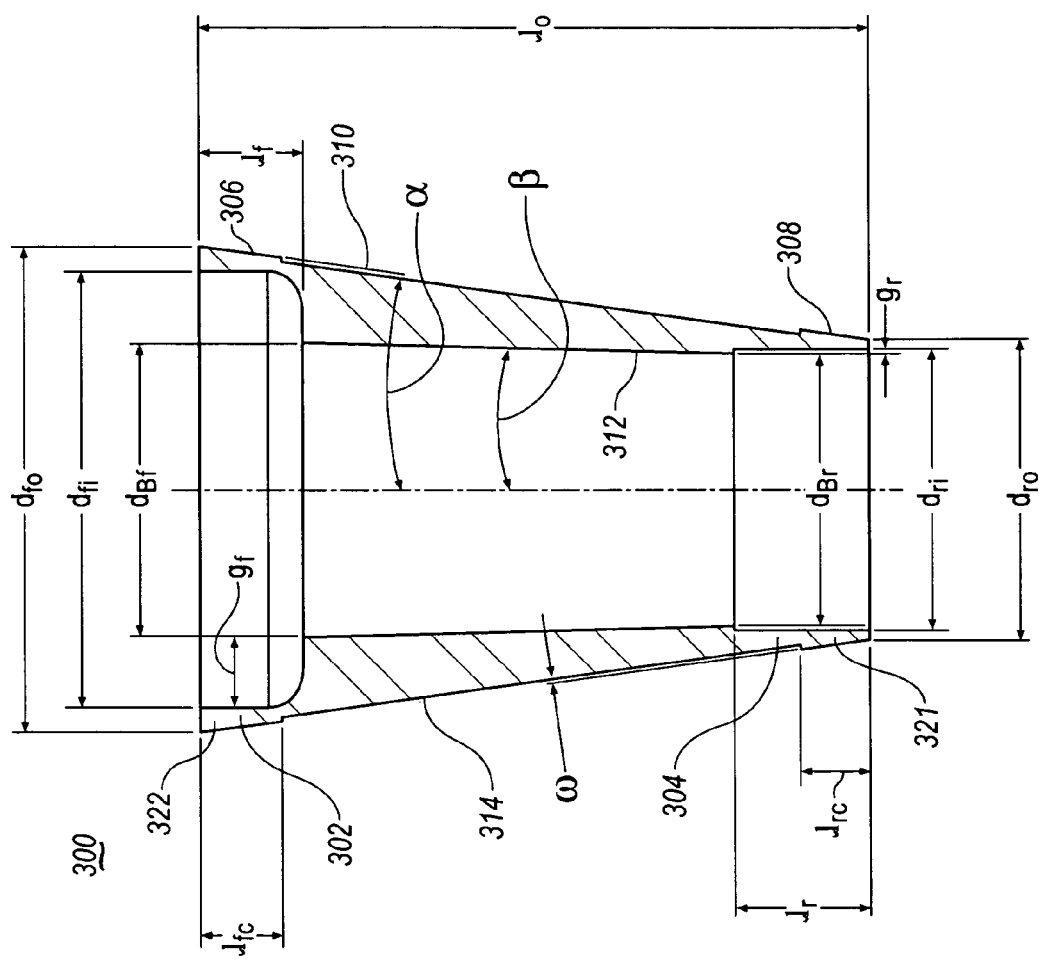
FIG. 11 is a cross section of an embodiment of the invention.

FIG. 11 is a cross section view of a presently preferred embodiment of a sleeve member 300 for a tool holder having two circular cantilevers 302, 304, one adjacent each of the front 306 and rear 308 contact portions, of the shank (not shown). The sleeve member 300 can be the same as the sleeve members 85 and 115 for the tool holders 50 and 100 described in connection with FIGS. 7a–7b. The sleeve member 300 can particularly be like the sleeve 115 of the tool holder 100, wherein the inner member 113 has a taper mating surface 90 intermediate a pair of generally cylindrical portions 93 and 123 adjacent front 60 and rear 62 contact portions of the shank 58, and specifically, the free ends 76, 106 of the two circular cantilevers 73, 103 on the ends of the sleeve member 115.

According to a presently preferred embodiment, the sleeve 300 outer surface 310 has the aforesaid 7/24 taper, shown as the half angle α (8 deg 17 min 50 sec), and an inside mating surface has a taper, also shown as a half angle β, which is 1 deg 30 min 0 sec. The outside mating surface of the inner member (not shown) will have the same taper as the inside mating surface 312 of the sleeve 300, i.e., 1 deg 30 min 0 sec. The annular recessed region 314 is provided between the circular cantilevers 302, 304, and has a depth ω of about 0.020 inch.

On the inside mating surface 312 of the sleeve member 300, adjacent each of the circular cantilevers 302, 304, a larger radius bore is provided to create the desired-gap between the generally cylindrical portions of the inner member and the ends of the sleeve, thus creating the free ends 321 and 322 of the circular cantilevers 306 and 308. At the front contact portion 306, the outside diameter $d_f$ of the free end 322 of the circular cantilever 302 can be about 2.750 inches, the inside diameter (which corresponds to the diameter $d_{bf}$ of the sleeve 300 at the front portion of the generally cylindrical front portion of the inner member) can be about 1.650 inches, and the inside diameter $d_{fi}$ of the free end 322 of the circular cantilever 306 can be about 2.460 inches. The difference between $d_{fi}$ and $d_{Bf}$ defines a gap $g_f$ between the free end 322 and the generally cylindrical portion of the inner member of about 0.405 inch adjacent the front contact portion 306. At the rear contact portion 308, the outside diameter $d_{ro}$ of the free end 321 of the circular cantilever 304 can be about 1.659 inches, the inside diameter $d_{br}$ of the sleeve 300 at the rear portion (which corresponds to the diameter of the generally cylindrical rear portion of the inner member) can be slightly less than 1.650 inches (accounting for the taper angle β) and the inside diameter $d_{ri}$ of the free end 321 of the circular cantilever 304 can be about 1.556 inches. This defines a gap between the free end and the inner member and the generally cylindrical rear portion of the inner member of slightly less than 0.0515 inch adjacent the rear contact portion 308.

The portion of the free end 322 of the circular cantilever 302 which forms the front contact surface 306 adjacent the tapered bore of the spindle can have a length $l_{fc}$ of about 0.460 inch and the portion of the free end 321 of the circular cantilever 304 which forms the rear contact surface 308 adjacent the tapered bore of the spindle can have a length $l_{rc}$ of about 0.380 inch. The total length $l_f$ of the free end 322 at the front circular cantilever 302 can be about 0.580 inch, whereas the total length $l_r$ of the free end 321 at the rear circular cantilever 304 can be about 0.747 inch. The overall length $l_o$ of the sleeve member 300 can be about 3.740 inches, and the overall length of the inner member (not shown) would typically be about 4.0 inches.

The presently preferred dimensions described above for the circular cantilever 304 adjacent the rear contact portion 308 can be the same for the circular cantilevers adjacent the rear contact portions of the single cantilever tool holders 50, 100 shown in FIGS. 5–6b and 9a–9b.

Tool holders according to the invention, as described herein, can reduce manufacturing costs of standard taper (non-face contact) tool holders. A pre-heat treated steel can be used for the inner member of the tool holder shank, eliminating the need for heat treatment after machining of the body details. The sleeve member can be machined and heat treated prior to assembly. Finish grinding of the taper would occur after assembly. This approach would reduce cycle time significantly by eliminating the need for heat treating after machining of the front end of the tool holder.

An improved fit for standard (non-face contact) tools can be achieved using the single circular cantilever tool holder, e.g., having a sleeve member with circular cantilever only at the rear portion of the shank. The hard taper contact at the front portion would assure proper tool axial positioning while the flexible circular cantilever rear contact portion would compensate for taper tolerance mismatches, eliminating "wobble" in the system. This design would eliminate the current multiple classes of taper accuracy for standard tapered tool holders because the tool holder with the rear circular cantilever can accommodate the taper angle differences between the shank and the spindle.

Thus, circular cantilever tool holders according to the invention can improve the fit-up, and therefore the balance, accuracy, and stiffness, of standard non-face contact steep taper tool holders, possibly reduce the manufacturing costs of standard non-face contact tool holders, and also provide performance improvement over the currently available face contact steep taper tool holders.

Performance improvements over current face contact tool holders can be achieved by the two circular cantilever tool holder embodiment which provides a three point contact, i.e., face contact, front circular cantilever and rear circular cantilever. The three point contact is provided without moving parts or exceptionally tight tolerances, and the three point contact is maintained in spite of taper angle mismatches, and at high rotational speeds because of the high interference that is produced upon assembly.

The circular cantilevers can be designed such that they have the configuration that best optimizes the performance of the tool holder. For example, stiff cantilevers will maximize tool holder stiffness. Flexible cantilevers will be more accommodating of taper mismatches and will also stay in contact with the spindle at high rotational speeds. The cantilevers could be slotted at two or more symmetric locations around the circumference in order to increase radial flexibility. However, such slots will reduce the tool holder lateral stiffness.

It should also be understood that other variations or modifications of the invention will become apparent to those of skill in the art in view of the preceding description. For example, in place of the flexible cantilevers on the tool shank, flexible regions could instead be placed in the spindle, or a spindle sleeve rather than the sleeve member on the shank. Such flexible sections would provide the same fit-up advantages to the tool holder, therefore improving accuracy and balance. An advantage to placing the flexibility in the spindle is that only one item would have to be modified resulting in fit-up advantages for all tool holders. However, a disadvantage of placing the flexibility in the spindle is that all tool holders would experience reduced joint stiffness, an undesirable change for roughing tools.

Figure 12B:
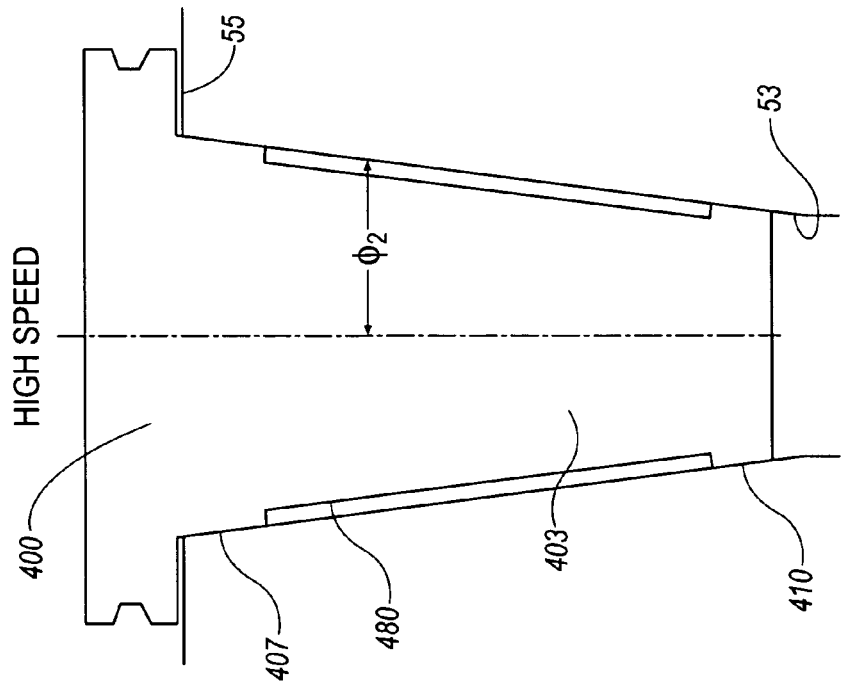
FIGS. 12a and 12b illustrate a further embodiment of a steep taper tool holder according to the invention.
Figure 12A:
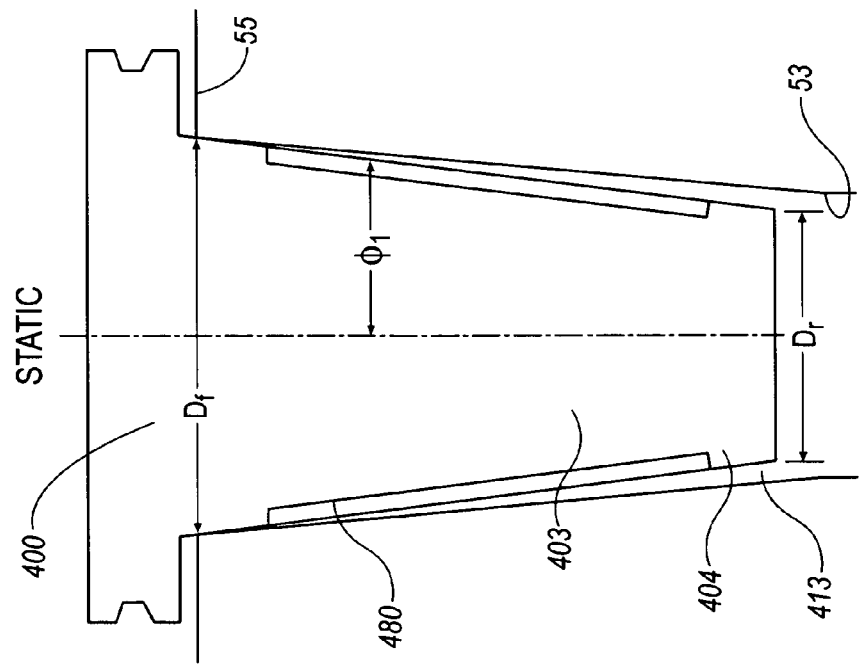

Referring now to FIGS. 12a and 12b, a further embodiment of an improved tool holder 400 is illustrated wherein the shank 403 of the tool holder 400 has a special taper $\Phi_1$ which is optimized to provided enhanced front and rear contact with the tapered bore 53 of the spindle 55 at a specific rotational speed, or within a predetermined range of speeds. As shown in FIG. 12a, there can be a relatively large difference between the taper $\Phi_1$ of the shank 403 and the tapered bore 53 under static conditions (at rest), resulting a relatively large gap 413 between the rear 404 of the shank 403 and the tapered bore 53 of the spindle 55. However, as shown in FIG. 12b, at a predetermined rotational speed the shank taper $\Phi_1$ changes slightly to an "optimized" taper $\Phi_2$ which closely matches the taper of the bore 53 (which has also changed from its static taper angle), at the predetermined rotational speed or range thereof.

As explained previously, the tapered bore 53 of the spindle has a taper defined by a front diameter and a rear diameter which is smaller than the front diameter. During rotation at high speeds, the front and rear diameters of the bore 53 each change at different rates under the influence of centrifugal force. Consequently, the tapered bore 53 has a different taper at different speeds of rotation.

In the optimized taper tool holder 400, the tapered outer surface of the shank 403, like the tapered bore 53 of the spindle 55, is also defined by a first diameter $D_f$ at the front contact portion 407 of the shank 403 and a second diameter $D_r$ at the rear contact portion 410 of the shank 403 which is smaller than the first diameter $D_f$. Also like the tapered bore 53 of the spindle 55, the first $D_f$ and second $D_r$ diameters each change at different rates under the influence of centrifugal force when the shank 403 is rotated at high speeds in the spindle 55. Thus, like the tapered bore 53, the tapered shank 403 also has a different taper at different speeds of rotation. Taking into account tolerances, the diameter $D_f$ of the front contact portion 407 of the shank 403 is generally equal (accounting for tolerance) to the diameter of the tapered bore 53 adjacent the front contact portion 407 when the shank 403 is at rest, and is thus in surface contact with the tapered bore 53. However, according to the invention, the diameter $D_r$ of the shank 403 at the rear contact portion 410 is selected to cause the tapered outer surface to have an optimized taper $\Phi_2$ when the shank 403 is rotated at a predetermined speed, or range of speeds. The optimized taper $\Phi_2$ is designed to substantially correspond to the taper of the tapered bore 53 of the spindle 55 within the desired range of speeds such that there is improved contact between both the front 407 and rear 410 contact portions of the tapered shank 403 and the tapered bore 53. Axial movement of the tool holder 400 into the tapered bore 53 will occur, since there is no face contact. Thus, hard contact is maintained at the front of the tapered bore 53 and the changing taper of the shank 403 will adjust to the taper angle mismatch with the bore 53 at the predetermined speed, or range thereof. As a result, although the tool holder 403 does move axially, hard contact is achieved at both the front 407 and rear 410 contact portions at the optimized operating speed, or range of speeds. As a result, rocking and radial motion of the tool holder 400 are eliminated, as is the associated accuracy and balance problems.

The optimized taper tool holder 400 does not include flexible cantilevers, but is instead specifically designed to operate at a predetermined optimized speed, or optimized range of speeds. In other words, it is designed to fit the taper of the bore 53 of the spindle 55 at a deformed condition which corresponds to the specific speed of rotation for which the taper of the tool holder 400 is optimized. The optimized taper design is identical to current prior art tool holders except for a very slight change in the taper angle, which results in an optimized taper at a desired operating speed, or range of operating speeds. Therefore, no additional manufacturing operations are required. The optimized taper tool holder 400 can include the annular recessed region 480 intermediate the front 407 and rear 410 contact portions. As described previously, the annular recessed region 480 can facilitate manufacture of the tapered outer surface of the shank 403 to the proper tolerances to achieve a good fit in the tapered bore 53 of the spindle 55.

Prior art steep taper (7/24) tool holders are made to industry standard taper angles and tolerances with the objective being to produce the best possible fit. If the taper angles differ, the tool holders can 'rock' in the spindle, resulting in accuracy and balance errors. Typical tolerance ranges for tool holders and spindles are based on "AT" classifications. The most frequently used classifications are AT2 for spindles and AT3 for tool holders. The angle tolerances for these classifications for 50 taper tool holders are:

|  |  | Minimum | Maximum |
|---|---|---|---|
| Spindle | AT2 | 16° 35' 36" | 16° 35' 40" |
| Tool | AT3 | 16° 35' 40" | 16° 35' 46" |

Using these classifications, the best possible condition for 50 taper tool holders is a perfect match between the spindle and tool holder and the worst case is a 10" difference.

Similar tolerances exist for other taper sizes. For instance, for 40 taper tool holders.

|  |  | Minimum | Maximum |
|---|---|---|---|
| Spindle | AT2 | 16° 35' 35" | 16° 35' 40" |
| Tool | AT3 | 16° 35' 40" | 16° 35' 48" |

Using these classifications, the worst case for 40 taper tool holders is a 13" difference.

As the tool holder and spindle turn at increasingly higher speeds, they deform and expand under the action of centrifugal forces. The spindle, having a greater average diameter, undergoes significantly more expansion than the tool holder. Furthermore, the front of the spindle, at the maximum taper diameter, expands more than the rear. This variable deformation changes the spindle taper angle, and therefore the fit up with the tool holder.

Since the front of the spindle taper increases the diameter faster than the rear, the fit up between the tool holder and spindle actually improves as the rotational speed begins to increase, up to the point where the tapers exactly match. The speed is dependent upon the original mismatch between the taper angles and upon the construction details of the spindle. Further increases in speed then begin to produce increasing amounts of taper mismatch, with the mismatch now producing clearance at the front of the spindle taper rather than at the rear of the spindle taper, as was the case when the spindle and tool holder were at rest.

According to the invention, the initial shank taper $\Phi_1$ is designed change to an optimized taper angle $\Phi_2$ at a desired operating speed (or range of speeds) to provide the best possible match between the spindle and tool holder tapers at such predetermined operating speed or range thereof. Thus, matching the tapers when the tool holder and spindle are at rest is not necessarily the best design objective. Rather, the design objective is to obtain the best possible match between spindle and tool holder tapers at the tool holder's operating speed. Since most tool holders can operate over a wide range of speeds, it is not possible to optimize the taper fit up for all speeds. However, it is possible to improve the fit up over the current designs in the typical operating speed ranges, and especially at a predetermined operating speed.

As an example, approximate calculations were done for a steep taper spindle and tool holder, assuming a spindle outer diameter of 100 mm and no radial expansion of the tool holder (the tool holder radial expansion will be very small as compared to the spindle). The calculations indicate that at 20,000 rpm the spindle taper angle will change, increase, by approximately 0° 0'26.7". Therefore, if the spindle and tool tapers perfectly match at rest, they will mismatch by 0° 0'26.7" at 20,000 rpm. However, if both tool holder and spindle were at the far extremes of their tolerance ranges at rest, a 0° 0'10" taper mismatch, then the mismatch at 20,000 rpm would be only 0° 0'16.7".

If, instead, the tool taper angle tolerance range is changed from 16° 35'40"–16"35'46" to 16° 36'00"16° 36'06", then the error range at 20,000 rpm would be reduced from the prior range of 0° 0'16.7"–0° 0'26.7" to a range of −0° 0'3.3"–0° 0'6.7", a reduction in the maximum possible taper angle error of 75 percent. An irony of the current spindle and tool tolerancing scheme is that the spindle/tool holder combinations that are at the far extreme of the tolerance fit up range at rest actually may have the best fit up at high speed.

Although for any specific tool holder tolerance range there would be an optimal operating speed, a range of speeds could be used in which the error would fall within some predetermined range. Either the tool holder or the spindle taper tolerances could be altered to effect the above change. However, it would be preferable to keep the spindle tolerance standard and only change the tool holder taper angle for tool holders designed for high speed operation. Otherwise, changing the spindle taper would result in increased errors for tool holders that are designed for low speed operation. By changing the tool holder taper tolerances, it would be possible to use different tolerances for different tool holders depending upon the intended range of operating speeds.

Note that the above examples do not use tighter tolerances, but only shift the tolerance band. Therefore, the impact on manufacturing costs should be negligible.

Figure 13:
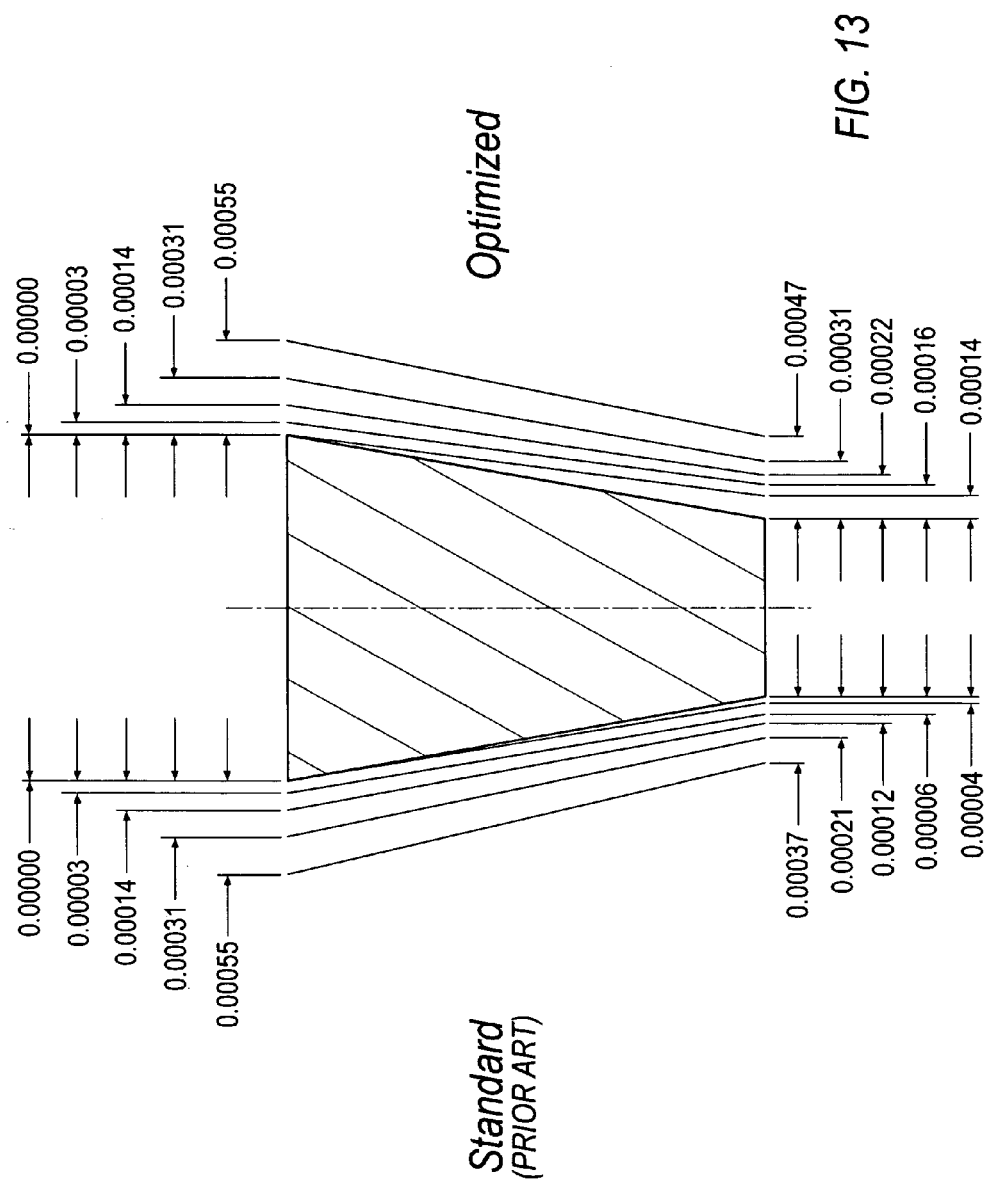
FIG. 13 illustrates changing taper angles of a conventional steep taper tool holder compared to an embodiment of the invention as shown in FIGS. 12a and 12b.

The diagram in FIG. 13 illustrates a comparison of a standard, prior art tool holder (left side) with tool holder having an optimized taper according to the invention (right side). The diagram shows how the spindle taper undergoes a taper angle change at different speeds of rotation versus the standard tool holder taper angle (left) and the optimized taper tool holder taper angle (right).

The uppermost dimensions shown, i.e., 0.0000 at both sides of the illustration, are when the tool holders are at rest. Each vertical line outward, at the front and rear portions of each side of the tool holders, represents an increase of 10,000 revolutions per minute (rpm) of the tool holder. Thus, the diagram illustrates the changes in diameter at the front and rear contact portions of the shanks from 0 to 40,000 rpm.

In the diagram, the optimized taper tool holder has been optimized for operation at 30,000 rpm, at which it can be seen that the dimension at both the front and rear contact portions of the optimized tool holder is 0.00031. As can be seen, the fit at the rear contact portion when the optimized taper tool holder is at rest is not nearly as tight as for the standard tool holder. However, at 30,000 rpm, the gap at the rear contact portion now generally matches the gap at the front contact portion, resulting in the taper having an improved fit against the tapered bore of the spindle.

While the invention has been specifically described in connection with certain specific embodiments thereof, it is to be understood that this is by way of illustration and not of limitation, and the scope of the appended claims should be construed as broadly as the prior art will permit.

What is claimed is:

1. A rotary tool holder for detachably retaining a rotary tool in a tapered bore of a spindle, the rotary tool holder comprising:
   a shank having a tapered outer surface corresponding to the tapered bore, the shank having a front contact portion and a rear contact portion;
   a flange adjacent the front contact portion;
   a first circular cantilever adjacent one of the front and rear contact portions, the first circular cantilever having a fixed end and a free end;
   wherein rotation of the rotary tool holder when disposed in the spindle results in the free end of the first circular cantilever expanding radially under the influence of centrifugal force such that the free end maintains contact with the tapered bore which also radially expands under the influence of centrifugal force during rotation;

a cavity formed in a rear face of the shank, the cavity having an exterior surface forming at least part of the first circular cantilever;

a pull stud having a first end captured in the cavity and a second end external of the cavity, the second end adapted to have tension applied thereto after the rotary tool holder is positioned in the spindle; and wherein the tension on the second end causes the first end to apply an outward radial force on the cavity which urges the exterior surface in a radially outward direction toward the tapered bore when the shank is positioned therein.

2. The rotary tool holder of claim 1 further comprising an annular recessed region in the tapered outer surface, the annular recessed region located intermediate the front and rear contact portions.

3. The rotary tool holder of claim 1 further comprising:
the cavity having an interior surface portion which tapers from a wider region of the cavity to a narrower region thereof forming a bottle neck;
the first end of the pull stud tapering from a larger distal portion captured in the wider region of the cavity to a narrower neck which extends through the narrower region of the cavity; and
wherein tension applied to the second end acts to draw the larger distal portion from the cavity which urges the narrower region of the in the radially outward direction.

4. A rotary tool holder for detachably retaining a rotary tool in a tapered bore of a spindle, the rotary tool holder comprising:
a shank having a tapered outer surface corresponding to the tapered bore, the shank having a front contact portion and a rear contact portion;
a flange adjacent the front contact portion;
a first circular cantilever adjacent one of the front and rear contact portions, the first circular cantilever having a fixed end and a free end;
wherein rotation of the rotary tool holder when disposed in the spindle results in the free end of the first circular cantilever expanding radially under the influence of centrifugal force such that the free end maintains contact with the tapered bore which also radially expands under the influence of centrifugal force during rotation;
an inner member;
a sleeve member disposed over the inner member, the sleeve member having the tapered outer surface and a first end, a first portion of the first end forming the first circular cantilever having the free and fixed ends, the free end spaced apart from the inner member;
the sleeve member having a second end, and a second portion of the second end forming a second circular cantilever having the free and fixed ends, the free end spaced apart from the inner member;
the second portion of the sleeve member positioned adjacent the front contact portion of the shank with the free end of the second circular cantilever extending toward the flange;
the first portion of the sleeve member positioned adjacent the rear contact portion of the shank, the free end of the first circular cantilever extending toward a rear face of the shank;

wherein rotation of the rotary tool holder in the spindle results in the free end of each of the first and second circular cantilevers expanding radially under the influence of centrifugal force such that the free ends maintain contact with the tapered bore which also expands under the influence of centrifugal force during the rotation;

the inner member having an outside mating surface, the outside mating surface having generally cylindrical portions at each of the front and rear contact portions of the shank and a tapered portion intermediate the generally cylindrical portions; and the sleeve member having an inside mating surface, the inside mating surface having a tapered portion corresponding to the tapered portion of the outside mating surface, and the free end of the each of the first and second circular cantilevers being spaced apart from the generally cylindrical portions of the outside mating surface.

5. A rotary tool holder for detachably retaining a rotary tool in a tapered bore of a spindle, the rotary tool holder comprising:
a shank having a tapered outer surface corresponding to the tapered bore, the shank having a front contact portion and a rear contact portion;
a flange adjacent the front contact portion;
a first circular cantilever adjacent one of the front and rear contact portions, the first circular cantilever having a fixed end and a free end;
wherein rotation of the rotary tool holder when disposed in the spindle results in the free end of the first circular cantilever expanding radially under the influence of centrifugal force such that the free end maintains contact with the tapered bore which also radially expands under the influence of centrifugal force during rotation;
an inner member;
a sleeve member disposed over the inner member, the sleeve member having the tapered outer surface and a first end, a first portion of the first end forming the first circular cantilever having the free and fixed ends, the free end spaced apart from the inner member;
the inner member having a stepped outer surface, the stepped outer surface having a plurality of generally cylindrical portions, each of the plurality of generally cylindrically portions increasing in diameter from a smaller diameter at the rear contact portion of the shank to a larger diameter at the front contact portion thereof;
the sleeve member having a stepped bore, the stepped bore having a plurality of generally cylindrical regions, each of the plurality of generally cylindrical regions increasing in diameter from a smaller diameter at the rear contact portion of the shank to a larger diameter at the front contact portion thereof; and
wherein the at least a portion of the generally cylindrical portions of the stepped outer surface mate with at least part of the plurality of generally cylindrical regions of the stepped bore when the sleeve member is disposed over the inner member.

6. The rotary tool holder of claim 5 wherein the plurality of generally cylindrical portions further comprises four generally cylindrical portions, the plurality of generally cylindrical regions further comprises three generally cylindrical regions, and at least part of two of the four generally cylindrical portions of the stepped outer surface mate with at least part of two of the three generally cylindrical regions of the stepped bore.

7. A rotary tool holder for detachably retaining a rotary tool in a tapered bore of a spindle in which the tapered bore has a taper defined by a front diameter and a rear diameter which is smaller than the front diameter, and wherein the front and rear diameters each change at different rates under the influence of centrifugal force when the spindle is rotated such that the tapered bore has a different taper at different speeds of rotation, the rotary tool holder comprising:

a shank having a tapered outer surface, the tapered outer surface having a taper defined by a first diameter and a second diameter which is smaller than the first diameter, the first and second diameters each changing at different rates under the influence of centrifugal force when the shank is rotated in the spindle such that the tapered outer surface has a different taper at different speeds of rotation;

the first diameter generally corresponding to the front diameter of the tapered bore when disposed therein and the spindle is rest;

wherein the second diameter is selected to cause the tapered outer surface to have an optimized taper when the shank is disposed in the spindle and rotated within a certain range of speeds, the optimized taper substantially corresponding to a taper of the tapered bore within the certain range of speeds such that improved contact between the tapered outer surface and the tapered bore results within the certain range of speeds; and an annular recessed region in the tapered outer surface of the tool holder intermediate the front and rear contact portions of the tool holder.

* * * * *